May 25, 1965 C. E. QUISENBERRY 3,185,498

TRICYCLE FRAME

Filed June 7, 1963 3 Sheets-Sheet 1

INVENTOR
CARTER E. QUISENBERRY
BY
ATTORNEY

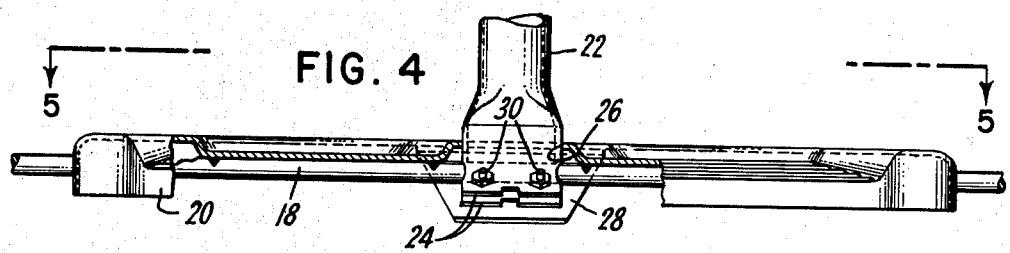
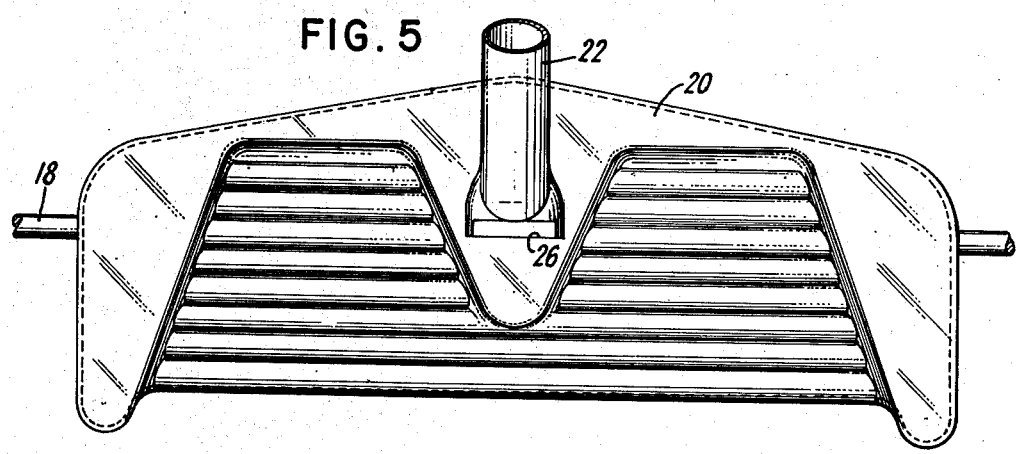
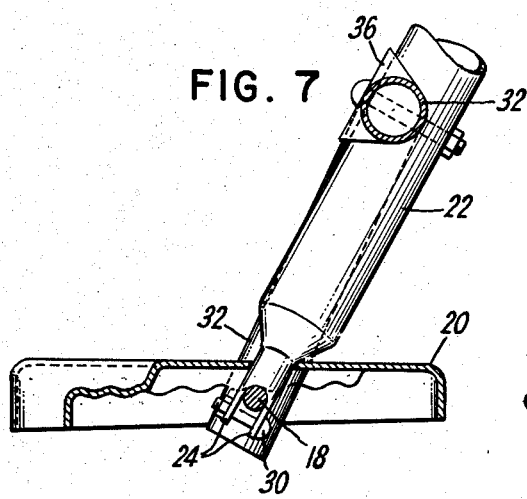

May 25, 1965 C. E. QUISENBERRY 3,185,498

TRICYCLE FRAME

Filed June 7, 1963 3 Sheets-Sheet 3

INVENTOR
CARTER E. QUISENBERRY
BY
ATTORNEY

United States Patent Office 3,185,498
Patented May 25, 1965

3,185,498
TRICYCLE FRAME
Carter Edwin Quisenberry, Olney, Ill., assignor to American Machine and Foundry Company, a corporation of New Jersey
Filed June 7, 1963, Ser. No. 286,249
7 Claims. (Cl. 280—291)

The present invention relates to children's wheel goods including tricycles and the construction thereof.

Tricycle frames have conventionally been made by welding or otherwise permanently joining the backbone to the rear platform step or rear axle in order to obtain a unitary frame construction. This construction of course requires a specialized manufacturing operation which is relatively expensive. Furthermore, it results in a large, cumbersome and irregularly shaped frame assembly, difficult to package or box for shipment, which increases the cost of transportation and consequently the consumer price.

It is a primary object of the present invention to provide a frame construction wherein the backbone and rear step platform or rear axle section is separable and to provide a frame assembly which is simpler in construction and cheaper to manufacture.

It is another object of this invention to provide a tricycle which in "knocked-down" condition occupies a smaller volume than tricycles of the conventional construction.

It is another object of the present invention to provide novel means for attaching the backbone member to the rear platform and/or the rear section of the tricycle. It is still another object to provide a frame construction suitable for a variety of tricycle designs and forms.

All of these and other objects, and the attendant advantages of this invention, will become more apparent from the detailed description which follows, reference being had to the accompanying drawings in which:

FIG. 4 is a rear view taken along lines 4—4 of FIG. 3;

FIG. 5 is a plan view of the rear section and portion of the tubular backbone, taken along line 5—5 of FIG. 4;

FIG. 7 is a sectional view taken along lines 7—7 of FIG. 6;

In the several figures of the drawing, like reference numerals indicate like parts.

Figure 1:
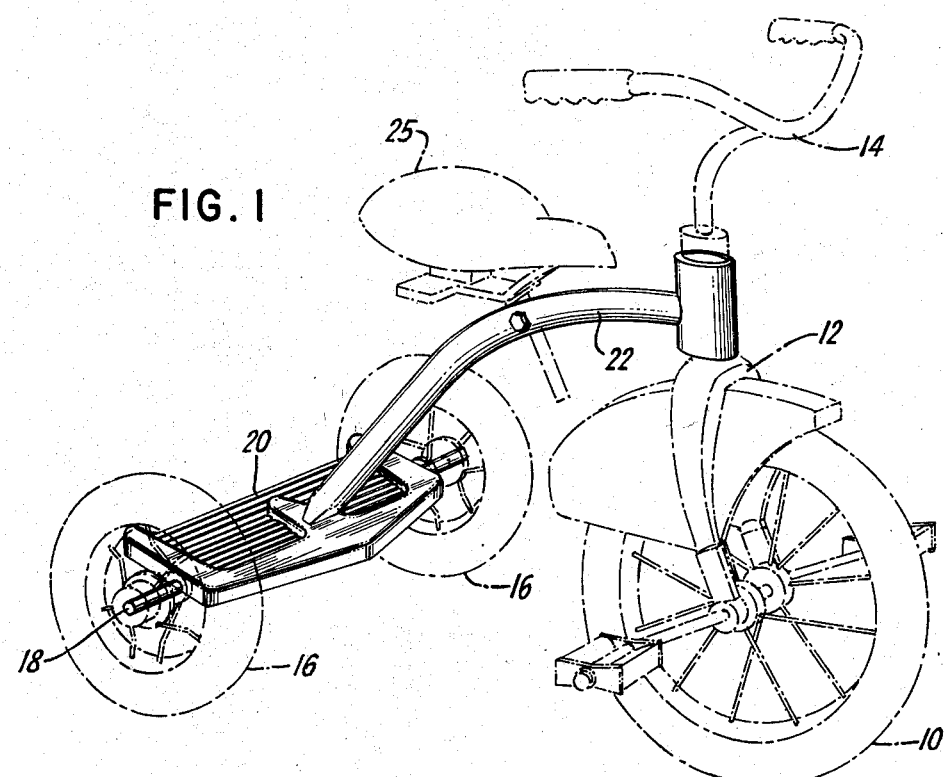
FIG. 1 is a front perspective view of a conventional tricycle embodying the present invention.
Figure 2:
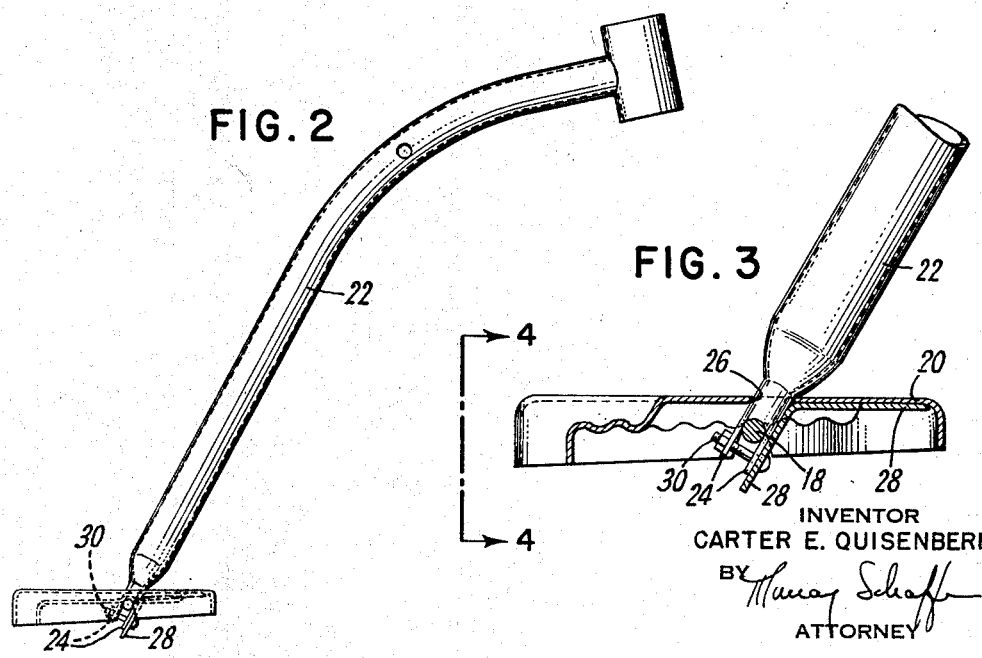
FIG. 2 is a side view of the backbone, rear axle and rear step assembly.
Figure 3:
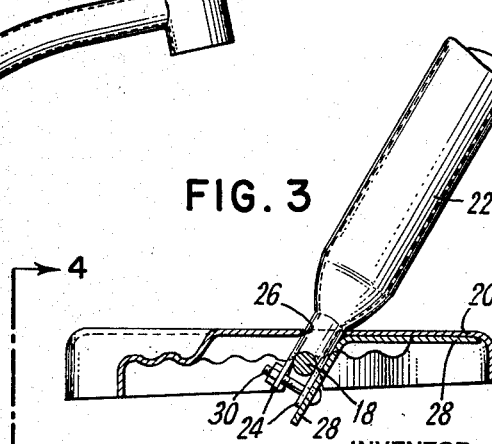
FIG. 3 is an enlarged view of a portion of FIG. 2 showing the connection of the backbone to the rear section.

With reference to FIG. 1 of the drawing, the tricycle shown is furnished in a conventional manner with the usual parts, i.e., in its front section a pedal wheel 10, a fork 12 supported thereon and a handlebar 14; at its rear section a pair of wheels 16 mounted on a fixed axle 18, a step platform or deck 20; and joining the two sections a tubular backbone 22 which mounts a seat 25. The improved frame construction of the present invention resides in the connection between the tubular backbone and the rear section.

As detailed in FIGS. 2 through 5, the invention comprises a backbone 22 made of a single piece of curved tubing, the rear end of which is tapered and worked so as to provide two opposed flat forklike portions 24 extending therefrom. The bifurcated extensions enter into a hole or aperture 26 at substantially the mid-point of the step platform 20 and straddle the rear axle 18 which is spot welded to the underside of the platform 20 in a conventional manner. The platform is provided with an angular backing plate 28 also spot welded or otherwise fixed to its underside, which has a downwardly projecting member at an angle of incidence of the forked portion 24 of the backbone as it enters through the platform aperture 26. The backing member 28 and the bifurcated portions 24 of the backbone are provided with aligned holes through which screw and bolt assemblies 30 are inserted.

An extremely secure and fast connection between the backbone and the platform and axle assembly is made by tightening the screw and bolts. This tightening flexes the bifurcated member about the axle as well as joining it with the backing member, thus restraining the backbone from rotating or twisting about the axle. It is readily apparent that there is provided by the present invention a tricycle frame which will occupy a minimum packaging volume when in "knocked-down" condition and which may be easily and simply assembled.

Figure 6:
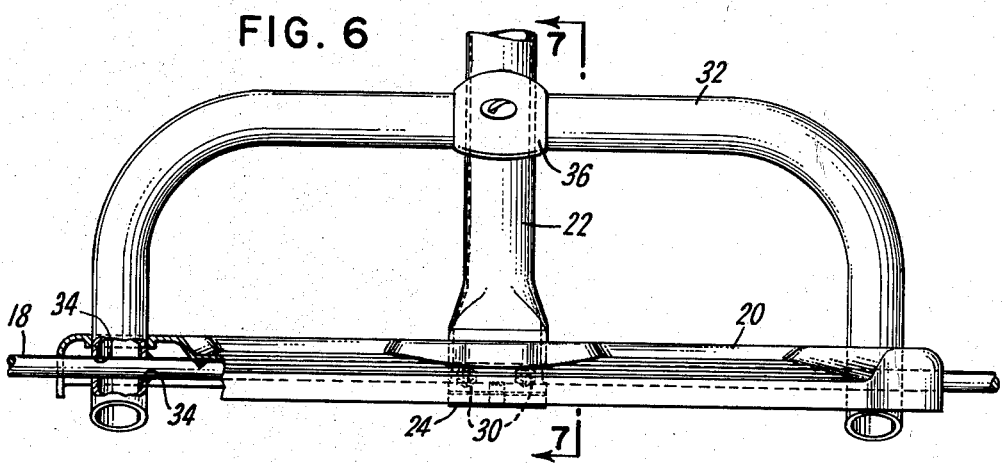
FIG. 6 shows the present invention as applied to a tricycle having a rear yoke axle support.

FIGS. 6 and 7 show the application of the present invention to a tricycle of slightly different rear section design from that shown in FIG. 1. In this design, the rear section comprises a tubular U-shaped yoke 32 straddling the platform 20. The yoke 32 is provided with holes 34 at its two ends through which the axle 18 is received. The platform, axle and yoke are preferably all spot welded together for rigid construction. The remainder of the tricycle (not shown) is similar in structure to that shown in FIG. 1 and the tubular backbone 22 is attached to the rear axle in the same way as previously described. The yoke 32 however is flattened or worked at its mid-point to provide a curved surface 36 which fits over the backbone 22 and may then be bolted thereto.

It had been conventional, in tricycles of this design, to weld the yoke and backbone together where they met. This required either forming the yoke in two parts or ending the backbone at the point where it met the yoke. This conventional practice resulted in a backbond and rear axle section more complex and cumbersome than even that of the conventional design similar to FIG. 1. It will be observed here that the present invention provides a separable frame construction having all the advantages previously noted and in addition the advantage that the completed assembly will be of stronger construction than conventionally built tricycles of similar design since neither the yoke nor the backbone is cut and both extend to the platform axle section.

In FIGS. 6 and 7 no backing plate (such as 28 in FIGS. 1–5) is shown to which the bifurcated end 24 of the backbone 22 may be attached, since sufficient rigidity is provided by joining the backbone 22 directly to the yoke 32 and by the bolting of the forked ends 24 about the axle 18. However, if desired, a backing plate 28 as shown in FIGS. 1–5 may be used.

It is also obvious that the yoke may have its ends formed and attached to the platform and axle in the same manner as the backbone so that additional savings in fabrication and assembly may be had by eliminating the welding operations thereon.

Figure 8:
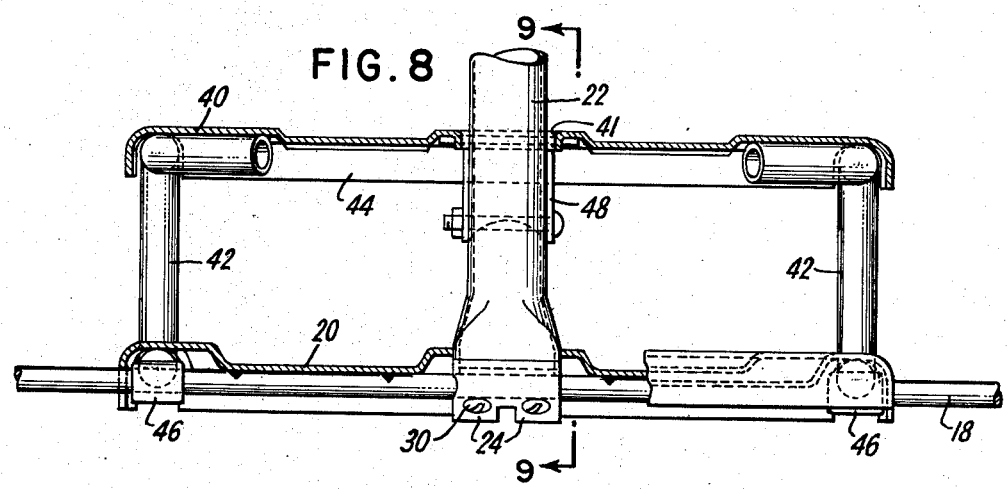
FIG. 8 shows the present invention as applied to a tricycle having a two-step platform at its rear section.
Figure 9:
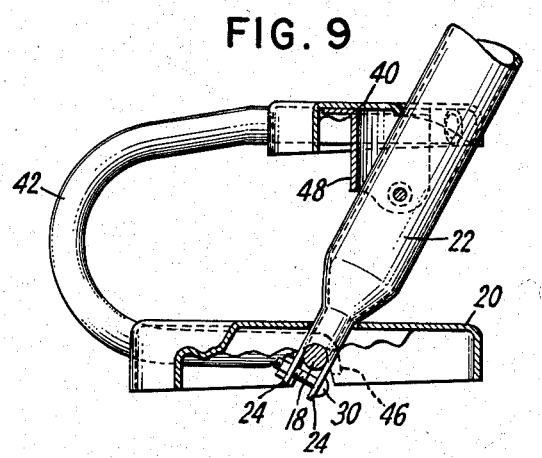
FIG. 9 is a cross sectional view taken along lines 9—9 of FIG. 8.

FIGS. 8–9 show the application of the present invention to still another design of tricycle from those previously shown. In these figures, the rear section is provided with a double-deck or platform assembly similar to the one shown in Des. Pat. 194,269 issued in December 1962 to Clifford Bessett. The second platform 40 is supported on a pair of cantilevered tubular structures 42 above the conventional platform 20. Each tubular structure 42 is preferably of one piece and curved to fit beneath the forward edge 44 of the upper platform and then downwardly beneath the lower platform 20. The lower ends 46 of the tubular structures 42 are hooked so as to fit over the axle 18. The remainder of the tricycle (not shown) is similar in structure to the tricycle shown in FIG. 1 and the backbone is attached in the same manner as previously described.

The upper platform 40 is formed with a generally V-shaped cut-out portion 41 mid-way of its forward edge so that it will in part straddle the backbone 22. It is also provided with a downwardly projecting semi-sleeve 48 preferably spot welded to the underside of the platform. The sleeve 48, which in part surrounds the backbone 22, is then bolted to the backbone. Between the bolting at the backbone and the hooking over the axle, the cantilevered structure and the upper platform are very rigidly supported.

Conventionally, the tricycle of the design shown in FIGS. 8–9 would have been welded or otherwise fixedly attached at the points where the backbone meets the upper and lower deck and at the points where the cantilevered structure joins the axle. It will be readily apparent that the present invention avoids the construction of a complex structure and provides an easily manufactured assembly frame even of this complex design.

In FIGS. 8–9 no backing plate is shown to which the forked end of the backbone is secured, illustrating again the ability of the bolting of this end about the axle to provide a strong attachment of the backbone to the axle. Of course, if desired, a backing plate may be provided.

It will thus be seen that the objects set forth above, among those made apparent from the preceding description, are efficiently attained and, since certain changes may be made in carrying out the above constructions, without departing from the scope of the invention, it is intended that all matter contained in the above description or shown in the accompanying drawing shall be interpreted as illustrative and not in a limiting sense.

I claim:

1. In a tricycle frame, a rear axle, a backbone coupled at one end to the mid-point of said axle, a step platform fixed to said axle and provided with an aperture to receive the backbone therethrough, said end of the backbone being bifurcated and straddling the axle, means releasably clamping the bifurcated backbone to said axle, a U-shaped yoke straddling the length of said axle, the end portions of said yoke being connected to the axle, and means releasably clamping the mid-point of said yoke to said backbone.

2. The combination according to claim 1, in which the end portions of the yoke are apertured and receive the end portions of the axle therethrough.

3. In a tricycle frame, a rear axle, a backbone having one end coupled to the mid-point of said axle, said one end of the backbone being bifurcated and straddling the rear axle, means releasably clamping the bifurcations to said axle, a step platform spaced above said axle, means depending from said platform and coupled to said axle to support said platform above said axle, and means releasably coupling said platform to said backbone.

4. The combination according to claim 3, including a lower step platform mounted on said axle and being apertured to receive the backbone therethrough.

5. The combination according to claim 3, in which the means supporting the platform includes a pair of members, one depending from each end portion of the platform, the lower end of each member being hook-shaped and received over its associated end portion of the axle.

6. The combination according to claim 5, in which each member is generally U-shaped, defining an upper leg cantilevered from the platform, and a lower leg cantilevered from the axle.

7. In a tricycle frame, a rear axle, a step platform fixed to said axle, a backbone coupled at one end to the mid-point of said axle, the platform being apertured to receive the backbone therethrough, the said end of the backbone being bifurcated and straddling the axle, the platform having an integral extension depending therefrom adjacent to and conterminous with the bifurcated end of the backbone, and means releasably clamping the bifurcated end of the backbone to the axle and to the platform extension.

References Cited by the Examiner

UNITED STATES PATENTS

| | | | |
|---|---|---|---|
| 398,173 | 2/89 | Meeker. | |
| 420,826 | 2/90 | Newhouse | 280—282 X |
| 1,800,888 | 4/32 | Johnson | 280—274 |
| 1,979,861 | 11/34 | Bullock | 280—291 |
| 1,984,916 | 11/34 | Bullock. | |
| 2,117,095 | 5/38 | Irwin | 306—40 X |
| 2,178,707 | 11/39 | Snell. | |
| 2,353,515 | 7/44 | Smith | 280—282 |
| 2,467,941 | 4/49 | Mackowiak | 280—282 X |
| 3,106,412 | 10/63 | Liljenberg | 280—291 |

FOREIGN PATENTS 1,012,689   4/52   France.

A. HARRY LEVY, *Primary Examiner.*

KENNETH H. BETTS, *Examiner.*